No. 783,726. Patented February 28, 1905.

UNITED STATES PATENT OFFICE.

FRANZ VON KÜGELGEN AND GEORGE O. SEWARD, OF HOLCOMBS ROCK, VIRGINIA, ASSIGNORS TO THE WILLSON ALUMINUM COMPANY, OF NEW YORK, N. Y., A CORPORATION OF NEW YORK.

PROCESS OF DETINNING.

SPECIFICATION forming part of Letters Patent No. 783,726, dated February 28, 1905.

Application filed August 1, 1904. Serial No. 219,052.

*To all whom it may concern:*

Be it known that we, FRANZ VON KÜGELGEN, a subject of the German Emperor, and GEORGE O. SEWARD, a citizen of the United States, both residing at Holcombs Rock, in the county of Bedford and State of Virginia, have jointly invented certain new and useful Improvements in Processes of Detinning, of which the following is a specification.

This invention aims to economically separate tin from other metals, such as the iron in tin-scrap, and provides certain improvements over the process described in our application, Serial No. 189,272, filed January 16, 1904.

In the process of this invention a solution of dry chlorin in a liquid which contains no moisture is used. In the very limited use of chlorin in metallurgical establishments hitherto for the extraction of metals the chlorin has been generally used in a wet state. Such processes have the drawback that almost all metals are attacked by wet chlorin. A separation of the metals is therefore impossible. For example, in detinning operations wet chlorin would not be practically useful, as together with the tin considerable amounts of iron would also be attacked. Dry chlorin, however, between certain limits of temperature acts on tin, but not on iron, and the application of this principle is the basis of our previous application above referred to. We have now discovered that a solution of the dry chlorin in stannic chlorid or other suitable anhydrous liquid removes the tin with a most astonishing completeness and rapidity. A piece of tin-scrap dropped into such a solution is detinned almost instantly, the iron being not attacked at all. Liquid stannic chlorid dissolves a large amount of chlorin gas, so as to make said chlorid particularly useful as a solvent. The detinning is very rapid, as stated, and the iron is not attacked; but even if the iron were attacked it would form chlorid of iron, which is insoluble in anhydrous stannic chlorid. The same advantage would be present where other metals are found in the tin-scrap, as the anhydrous stannic chlorid does not dissolve other chlorids. The stannic chlorid containing the dry chlorin gas in solution attacks the tin, forming more stannic chlorid, and thus adding to the quantity originally in use.

The process in detail, for example, may be carried out as follows: Tin-scrap is placed in a closed vessel, so as to prevent moisture reaching the materials, and is there subjected to a solution of dry chlorin in anhydrous stannic chlorid. There should always be present a sufficient quantity of dissolved chlorin to form an excess above the amount necessary to convert the tin into stannic chlorid. After the chlorination has taken place the stannic chlorid or a part of it may be regenerated by the addition of a suitable quantity of fresh dry chlorin, so that it may be used again. Thus the same quantity of stannic chlorid may be used repeatedly, taking away after each operation the quantity of new stannic chlorid formed. The stannic chlorid removed may then be treated for the recovery of the metal tin by electrolysis or by chemical or other suitable process.

Various other methods of manipulation of the materials may be used. Though stannic chlorid is preferable for the reasons above stated, yet any other liquid might be used which is capable of dissolving dry chlorin and which contains no moisture.

Though we have described with great particularity of detail a process embodying the invention, yet it is not to be understood therefrom that the invention is limited to the specific embodiment disclosed. Various modifications may be made by those skilled in the art without departure from the invention.

What we claim is—

1. The process of detinning which consists in subjecting the tinned metal to the action of an anhydrous liquid containing dry chlorin.

2. The process of detinning which consists in subjecting the tinned metal to the action of anhydrous-liquid stannic chlorid containing dissolved dry chlorin.

3. The process of detinning which consists in subjecting the tinned metal to the action of anhydrous-liquid stannic chlorid containing dissolved dry chlorin in excess of the amount necessary to convert the tin into stannic chlorid.

In witness whereof we have hereunto signed our names in the presence of two subscribing witnesses.

FRANZ VON KÜGELGEN.
GEORGE O. SEWARD.

Witnesses:
   JNO. B. HUFFARD,
   E. F. SCALES, Jr.